(12) United States Patent
Murai et al.

(10) Patent No.: US 10,676,627 B2
(45) Date of Patent: Jun. 9, 2020

(54) INK JET INK COMPOSITION AND RECORDING METHOD

(71) Applicant: Seiko Epson Corporation, Tokyo (JP)

(72) Inventors: Masayuki Murai, Matsumoto (JP); Hidehiko Komatsu, Chino (JP); Hiroyuki Kaneko, Minamiminowa (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 15/878,718

(22) Filed: Jan. 24, 2018

(65) Prior Publication Data
US 2018/0244934 A1 Aug. 30, 2018

(30) Foreign Application Priority Data

Feb. 28, 2017 (JP) .................. 2017-036966

(51) Int. Cl.
C09D 11/00 (2014.01)
C09D 11/328 (2014.01)
(Continued)

(52) U.S. Cl.
CPC .......... C09D 11/328 (2013.01); C09D 11/037 (2013.01); C09D 11/50 (2013.01);
(Continued)

(58) Field of Classification Search
USPC ......... 106/31.01, 31.13, 31.27, 31.43, 31.47, 106/31.49
See application file for complete search history.

(56) References Cited

U.S. PATENT DOCUMENTS

2005/0279248 A1* 12/2005 Auslander .............. C09D 11/32
106/31.28
2006/0012657 A1* 1/2006 Nagashima ............ C09D 11/50
347/100
(Continued)

FOREIGN PATENT DOCUMENTS

JP 2015-091947 A 5/2015
JP 2016-044258 A 4/2016
(Continued)

OTHER PUBLICATIONS

Extended European Search Report for Application No. EP 18 15 4546 dated May 11, 2018 (5 pages).

Primary Examiner — James E McDonough
(74) Attorney, Agent, or Firm — Harness, Dickey & Pierce, P.L.C.

(57) ABSTRACT

An ink jet ink composition includes one or two or more compounds A selected from the group consisting of a compound represented by Formula (1) and a compound represented by Formula (4), one or two or more compounds
(Continued)

B selected from the group consisting of a compound represented by Formula (2), a compound represented by Formula (3), and a compound represented by Formula (5), and water, (1)

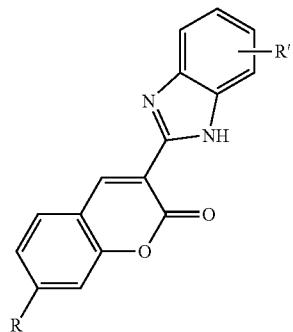

(2)

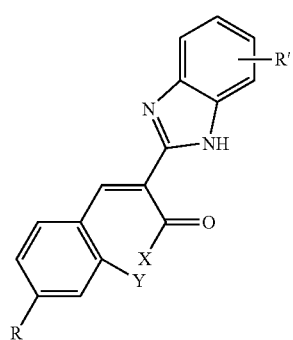

(3)

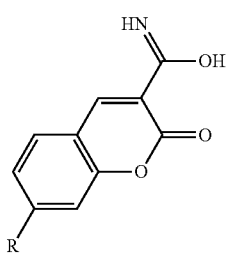

(4)

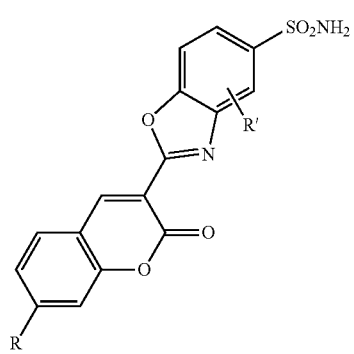

(5)

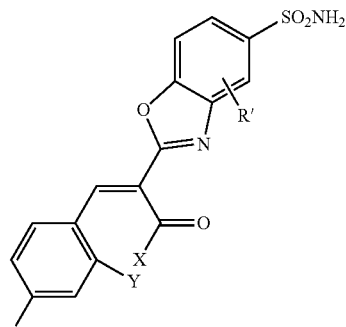

(in Formula (1) to Formula (5), R each independently represents $NZ_2$ or OZ; R' each independently represents a hydrogen atom, a sulfate group, or a sulfate; X each independently represents a hydroxyl group or a hydroxide salt; Y each independently represents a hydrogen atom, a hydroxyl group, or a hydroxide salt; and Z each independently represents a hydrogen atom or an alkyl group having 1 to 6 carbon atoms).

20 Claims, 1 Drawing Sheet

(51) Int. Cl.
| | | |
|---|---|---|
| *D06P 5/30* | (2006.01) | |
| *C09D 11/50* | (2014.01) | |
| *D06P 1/00* | (2006.01) | |
| *D06P 1/642* | (2006.01) | |
| *D06P 1/62* | (2006.01) | |
| *C09D 11/037* | (2014.01) | |
| *C09D 1/00* | (2006.01) | |
| *C09D 4/00* | (2006.01) | |
| *C09D 5/00* | (2006.01) | |
| *C09K 3/00* | (2006.01) | |

(52) U.S. Cl.
CPC ............ *D06P 1/0012* (2013.01); *D06P 1/628* (2013.01); *D06P 1/6426* (2013.01); *D06P 5/30* (2013.01)

(56) References Cited

U.S. PATENT DOCUMENTS

2006/0021545 A1* 2/2006 Nagashima ............ B41J 2/1404
106/31.27
2006/0234018 A1 10/2006 Nagashima et al.
2016/0272832 A1 9/2016 Kobayashi et al.
2016/0272834 A1 9/2016 Kobayashi et al.

FOREIGN PATENT DOCUMENTS

| JP | 2016-044259 A | 4/2016 |
| JP | 2016-176070 A | 10/2016 |
| WO | WO-2004-096928 A1 | 11/2004 |
| WO | WO-2006-049305 A1 | 5/2006 |

\* cited by examiner

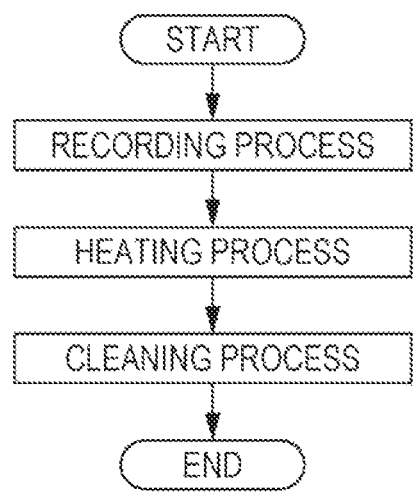

INK JET INK COMPOSITION AND RECORDING METHOD

BACKGROUND

1. Technical Field

The present invention relates to an ink jet ink composition and a recording method.

2. Related Art

An ink jet recording method is capable of recording a high-resolution image, by a relatively simple apparatus, and is rapidly developed in various fields. Therein, various studies of more stably obtaining a recorded material of high quality, is made.

For example, International Publication No. 2004/096928 has a purpose that is to provide a fluorescent ink having a high fluorescence intensity and an ink jet recording method using the fluorescent ink, and discloses that a second fluorescent coloring material which emits fluorescent light by a standard excitation wavelength is added such that a light-emitting wavelength range of the second fluorescent coloring material substantially includes at least a peak wavelength region which is equivalent to a peak region adjacent to a standard fluorescent wavelength in an excitation wavelength region for obtaining the light-emitting of the standard fluorescent wavelength of a first fluorescent coloring material in an ink, at the time of preparing a printing ink including the first fluorescent coloring material that causes the standard fluorescent wavelength used for measurement or determination to emit the light, within a wavelength which emits the fluorescent light by granting of the standard excitation wavelength.

JP-A-2016-44259 has a purpose that is to provide an ink jet textile printing ink set of which color reproducibility is favorable in a hue range of yellow-red-magenta-blue-cyan-green, and discloses an ink jet textile printing ink set including at least five inks of two yellow ink containing colorants which are different from each other, two magenta inks, and a cyan ink, in which one of the yellow inks contains C.I. Acid Yellow 184 as a colorant, and one of the magenta inks contains C.I. Acid Red 52 as a colorants.

JP-A-2015-91947 has a purpose that is to provide a colored curable resin composition which is excellent in heat resistance, and is capable of forming a color filter with high brightness, and discloses a dye dispersion liquid obtained by dispersing a dye in a solvent with a dispersing agent, in which the dye includes a coumarin dye, and does not substantially include a pigment, a content of the coumarin dye is 40 mass % or more and 100 mass % or less to a total quantity of the dye, an amine value of the dispersing agent is 0 to 200 mgKOH/g, the solvent includes propylene glycol monomethyl ether acetate, and the content of propylene glycol monomethyl ether acetate is 40 mass % or more and 99 mass % or less with respect to the total quantity of the solvent.

International Publication No. 2006-049305 has a purpose that is to provide a recorded image forming method with high reliability which is capable of providing a recorded material which is excellent in print quality, by a recorded material having high fluorescence intensity and high recording density, and discloses a fluorescent image forming method of forming a fluorescent image, by overlapping a fluorescent ink, in the fluorescent image forming method of forming the fluorescent image by using the fluorescent ink.

Here, the ink composition disclosed in International Publication No. 2004/096928 includes a coloring material having a specific coumarin structure, thereby, it is possible to obtain an excellent chromogenic property. However, the coloring material having the specific coumarin structure is contained, thereby, in the image obtained by performing the recording with a use of the ink composition described above, the chromogenic property is greatly changed in accordance with heating and elapsed time, and there is room for improvement in color stability.

JP-A-2016-44259 discloses the ink jet textile printing ink set including one of the yellow inks which contains C.I. Acid Yellow 184 as a colorant, but at least, does not disclose color stability after the textile printing or prevention of hydrolysis of the coloring material having the coumarin structure.

JP-A-2015-91947 discloses the dye dispersion liquid of which the dye includes the coumarin dye, but does not disclose that the colored curable resin composition including the dye dispersion liquid is used in order to form the color filter with high brightness, and at least, is used for the ink jet textile printing.

International Publication No. 2006-049305 discloses that the fluorescent image is formed by overlapping the fluorescent inks which are different from each other, but does not disclose that at least, the fluorescent ink is used for the ink jet textile printing. International Publication No. 2006-049305 does not disclose color stability after the textile printing or prevention of hydrolysis of the coloring material having the coumarin structure.

SUMMARY

An advantage of some aspects of the invention is to provide an ink jet ink composition which is excellent in chromogenic property, and is excellent in color stability.

The inventors diligently studied in order to solve the above problems, as a result, found out that color stability was excellent by using the ink jet ink composition including a compound A having a specific cyclic ester structure, a compound B having a specific carbonyl structure, and water, and the invention was completed.

According to an aspect of the invention, there is provided an ink jet ink composition including one or two or more compounds A selected from the group consisting of a compound represented by Formula (1) and a compound represented by Formula (4), one or two or more compounds B selected from the group consisting of a compound represented by Formula (2), a compound represented by Formula (3), and a compound represented by Formula (5), and water,

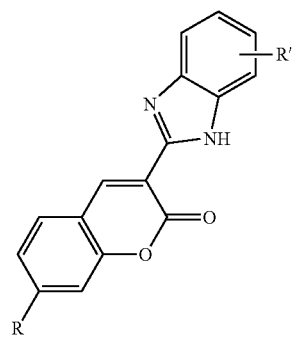

(1)

-continued

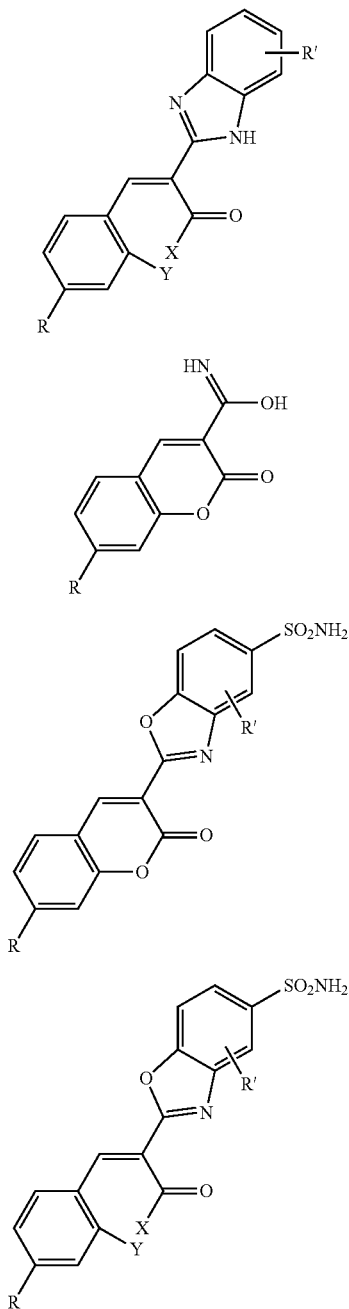

(in Formula (1) to Formula (5), R each independently represents NZ2 or OZ; R' each independently represents a hydrogen atom, a sulfate group, or a sulfate; X each independently represents a hydroxyl group or a hydroxide salt; Y each independently represents a hydrogen atom, a hydroxyl group, or a hydroxide salt; and Z each independently represents a hydrogen atom or an alkyl group having 1 to 6 carbon atoms).

The reason why such an ink jet ink composition can solve the problem of the invention is considered as follows. However, the reason is not limited thereto. That is, in the ink jet ink composition of the related art, regarding the image obtained by performing the recording with the use of the ink composition, the compound having the specific cyclic ester structure is mainly hydrolyzed, resultantly, the chromogenic property is greatly changed in accordance with heating or elapsed time. On the other hand, the ink jet ink composition according to the aspect of the invention includes the compound A having a specific cyclic ester structure, thereby, it is possible to obtain the excellent chromogenic property. Mainly, the ink jet ink composition according to the aspect of the invention further includes the compound B having a specific carbonyl structure, thereby, the compound B is selectively decomposed, and the stability of the entire compound contributing to the chromogenic property is enhanced, resultantly, the change of the chromogenic property is prevented regardless of heating or elapsed time, and the color stability is excellent.

In the ink jet ink composition, it is preferable that a content ratio of the compound B to the compound A be 0.5/99.5 to 50/50, in a standard of mass, it is preferable that the ink jet ink composition include the compound B which is 0.002 mass % to 2.5 mass % with respect to a total quantity of the ink jet ink composition, it is preferable that a pH of the ink jet ink composition be 6.0 to 9.5, it is preferable that an organic acid be included, it is preferable that the organic acid have a carboxylic acid structure, and it is preferable that an organic amine be included.

According to another aspect of the invention, there is provided an ink set including the ink jet ink composition according to the aspect of the invention, and one or two or more ink compositions selected from a group which is formed of a yellow ink, a magenta ink, a cyan ink, a red ink, a blue ink, a black ink, and an orange ink. According to still another aspect of the invention, there is provided a recording method including transporting a recording medium including a textile, and recording the ink jet ink composition according to the aspect of the invention on the recording medium.

BRIEF DESCRIPTION OF THE DRAWING

The invention will be described with reference to the accompanying drawings, wherein like numbers reference like elements.

FIGURE is a flowchart illustrating an example of a textile printing method according to an embodiment, regarding a recording process and subsequent processes thereof.

DESCRIPTION OF EXEMPLARY EMBODIMENTS

Hereinafter, an embodiment (referred to as "the embodiment", hereinafter) of the invention will be described in detail with reference to the drawings as necessary, but the invention is not limited thereto, and may be variously modified in the scope without departing from the gist thereof.

In the specification herein, "textile printing" is referred to as recording (printing) an ink on a recording medium including a textile. "Ink jet textile printing" is referred to as recording (printing) the ink on the recording medium including the textile by using an ink jet method, and is one of ink jet recording. "Recorded material" is referred to as a material in which an image is formed by recording the ink on the recording medium including the textile.

Ink Composition

An ink jet ink composition (simply referred to as "ink composition", hereinafter) according to the embodiment, is an ink jet ink composition including one or two or more compounds A (simply referred to as "compound A" or "A", hereinafter) selected from the group consisting of a compound represented by Formula (1) and a compound represented by Formula (4), one or two or more compounds B (simply referred to as "compound B" or "B", hereinafter) selected from the group consisting of a compound represented by Formula (2), a compound represented by Formula (3), and a compound represented by Formula (5), and water.

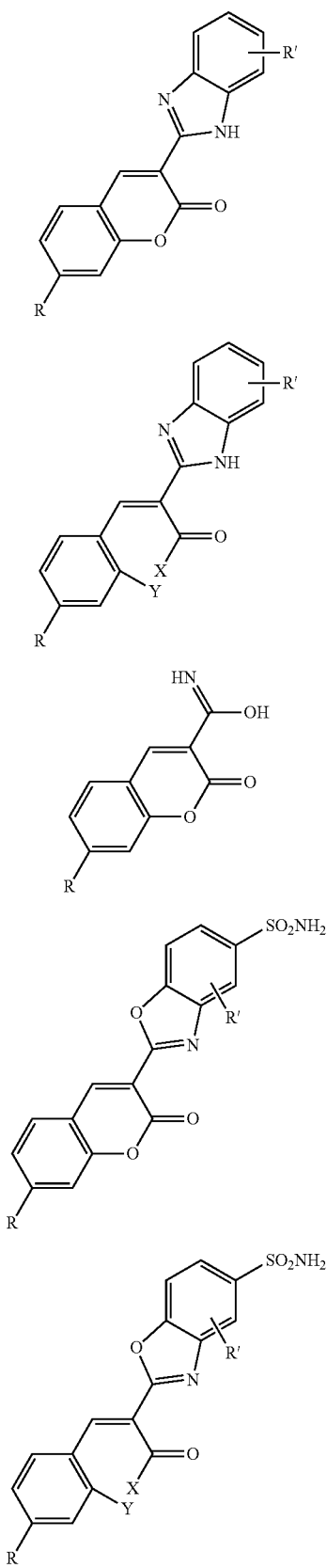

In Formula (1) to Formula (5), R each independently represents $NZ_2$ or OZ, R' each independently represents a hydrogen atom, a sulfate group, or a sulfate, X each independently represents a hydroxyl group or a hydroxide salt, Y each independently represents a hydrogen atom, a hydroxyl group, or a hydroxide salt, and Z each independently represents a hydrogen atom or an alkyl group having 1 to 6 carbon atoms. For example, R represents a diethylamino group.

Here, the salt of the sulfate or the hydroxide salt is not particularly limited, but for example, a lithium salt, a sodium salt, or a potassium salt may be used.

The compound represented by Formula (1) is not particularly limited, but for example, C.I. Acid Yellow 184 may be used.

The compound represented by Formula (2) is not particularly limited, but for example, a compound which is synthesized in Example described later may be used.

The compound represented by Formula (3) is not particularly limited, but for example, a compound which is synthesized in Example described later may be used.

The compound represented by Formula (4) is not particularly limited, but for example, C.I. Acid Yellow 250 may be used.

The reason why the ink composition according to the embodiment is excellent in color stability is considered as follows. However, the reason is not limited thereto. That is, in the ink composition of the related art, regarding the image obtained by performing the recording with the use of the ink composition, the compound having the specific cyclic ester structure is mainly hydrolyzed, resultantly, a chromogenic property is greatly changed in accordance with heating or elapsed time. On the other hand, the ink composition according to the embodiment includes the compound A having a specific cyclic ester structure, thereby, it is possible to obtain the excellent chromogenic property. Mainly, the ink composition according to the embodiment further includes the compound B having a specific carbonyl structure, thereby, the compound B is selectively decomposed, and stability of the entire compound contributing to the chromogenic property is enhanced, resultantly, the change of the chromogenic property is prevented regardless of heating or elapsed time, and color stability is excellent. Since the color stability is excellent, thereby, the changes of the chromogenic property is prevented before and after a post-treatment in a case of being used in the ink jet textile printing, it is possible to evaluate the chromogenic property more efficiently. The ink composition according to the embodiment is also excellent in fluorescence and preservation stability.

A pH of the ink composition according to the embodiment is preferably 6.0 or more and 9.5 or less, is more preferably 6.5 or more and 9.0 or less, is further preferably 7.0 or more and 8.5 or less, and is still further preferably 7.0 or more and 8.0 or less. The pH is in such a range, thereby, the hydrolysis of the compound A is prevented, resultantly, the preservation stability of the ink composition according to the embodiment tends to be further enhanced.

Compound A, Compound B

The compound A and the compound B according to the embodiment are included in the ink composition according to the embodiment, mainly, as a coloring material. The compound A and the compound B are included at the same time, thereby, the ink composition of the embodiment is excellent in chromogenic property and color stability.

A content of the compound A is preferably 0.1 mass % or more and 10 mass % or less, is more preferably 0.2 mass % or more and 6.0 mass % or less, is further preferably 0.3 mass % or more and less than 3.0 mass %, and is still further preferably 0.5 mass % or more and 1.0 mass % or less, with respect to a total quantity (100 mass %) of the ink composition. The content of the compound A is 0.1 mass % or more, thereby, the chromogenic property tends to be further enhanced. The content of the compound A is 10 mass % or less, thereby, the fluorescence, the color stability, and the preservation stability tend to be further enhanced. It is preferable that the content of the compound A is 5.5 mass % or more and 10 mass % or less, from the viewpoint of further enhancing the chromogenic property.

The content of the compound B is preferably 0.002 mass % or more and 2.5 mass % or less, is more preferably 0.02 mass % or more and 1.5 mass % or less, is further preferably 0.1 mass % or more and 1.0 mass % or less, and is still further preferably 0.2 mass % or more and 0.7 mass % or less, is still more preferably 0.3 mass % or more and 0.6 mass % or less, and is very preferably 0.3 mass % or more and 0.4 mass % or less, with respect to the total quantity (100 mass %) of the ink composition. The content of the compound B is 0.002 mass % or more, thereby, the color stability and the preservation stability tend to be further enhanced. The content of the compound B is 2.5 mass % or less, thereby, the chromogenic property and the fluorescence tend to be further enhanced.

A content ratio (compound B/compound A) of the compound B to the compound A is preferably 0.5/99.5 or more and 50/50 or less, is more preferably 5/95 or more and 40/60 or less, is further preferably 10/90 or more and 35/65 or less, and is still further preferably 20/80 or more and 32/68 or less, in a standard of mass. The content ratio is 0.5/99.5 or more, thereby, the color stability and the preservation stability tend to be further enhanced. The content ratio is 50/50 or less, thereby, the chromogenic property and the fluorescence tend to be further enhanced.

The ink composition according to the embodiment may further include a coloring material in addition to the compound A and the compound B. As such a coloring material, for example, the following materials may be used. One coloring material may be used alone, or two or more coloring materials may be used in combination.

The coloring material used for a yellow ink is not particularly limited, but for example, C.I. Acid Yellow 1, 3, 6, 11, 17, 18, 19, 23, 25, 36, 38, 40, 40:1, 42, 44, 49, 59, 59:1, 61, 65, 67, 72, 73, 79, 99, 104, 159, 169, 176, 193, 200, 204, 207, 215, 219, 219:1, 220, 230, 232, 235, 241, 242, or 246 may be used.

The coloring material used for a magenta ink or a red ink is not particularly limited, but for example, C.I. Acid Red 1, 6, 8, 9, 13, 18, 27, 35, 37, 52, 54, 57, 60, 73, 82, 88, 97, 97:1, 106, 111, 114, 118, 119, 127, 131, 138, 143, 143:1, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, or 415, and C.I. Acid Violet 17, 19, 21, 42, 43, 47, 78, 79, 54, 66, 78, 90, 97, 102, 109, or 126 may be used.

The coloring material used for an orange ink is not particularly limited, but for example, C.I. Acid Orange 3, 7, 8, 10, 19, 22, 24, 33, 39, 51, 51S, 56, 67, 74, 80, 86, 87, 88, 89, 94, 95, 107, 108, 116, 122, 127, 140, 142, 144, 149, 152, 156, 162, 166, or 168 may be used.

The coloring material used for a cyan ink or a blue ink is not particularly limited, but for example, C.I. Acid Blue 1, 7, 9, 15, 23, 25, 40, 61:1, 62, 72, 74, 80, 83, 9092, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, and 350, and C.I. Acid Violet 17, 19, 21, 42, 43, 47, 48, 78, 79, 54, 66, 78, 90, 97, 102, 109, or 126, and C.I. Acid Green 9, 12, 16, 19, 20, 25, 27, 28, 40, 43, 56, 73, 81, 84, 104, 108, or 109 may be used.

The coloring material used for a black ink is not particularly limited, but for example, C.I. Acid Black 1, 2, 3, 24, 24:1, 26, 31, 50, 52, 52:1, 58, 60, 63, 63S, 107, 109, 112, 119, 132, 140, 155, 172, 187, 188, 194, 207, or 222 may be used.

The ink composition according to the embodiment can be used as a yellow ink, a magenta ink, a cyan ink, a red ink, a blue ink, a black ink, or an orange ink, by adjusting kinds and the contents of various coloring materials and other components in addition to the compound A and the compound B. Preferably, the ink composition according to the embodiment can be used as a yellow ink or an orange ink.

Water

The ink composition according to the embodiment includes the water. As water, for example, pure water such as ion-exchanged water, ultrafiltration water, reverse osmosis water, or distilled water, and water such as ultrapure water of which ionic impurities are removed as much as possible may be used. If the water which is sterilized by UV irradiation or addition of hydrogen peroxide is used, it is possible to prevent occurrence of fungi and bacteria in a case where an aggregating liquid is preserved for a long time. Thereby, the preservation stability tends to be further enhanced.

The content of the water is preferably 50 mass % or more, is more preferably 60 mass % or more, and is particularly preferably 70 mass % or more, with respect to the total quantity (100 mass %) of the ink composition.

Organic Solvent

The ink composition according to the embodiment may include an organic solvent. The organic solvent is not particularly limited as long as the organic solvent is an organic solvent that can be used along with the water.

The kind of the organic solvent is not particularly limited, but for example, a cyclic nitrogen compound, a non-protonic polar solvent, monoalcohol, alkylpolyol, or glycol ether may be used.

The non-protonic polar solvent is not particularly limited, but for example, a cyclic ketone compound, a chain-shaped ketone compound, and a chain-shaped nitrogen compound may be used. As a cyclic nitrogen compound and a non-protonic polar solvent, solvents of pyrrolidones, imidazolidinones, sulfoxides, lactones, amide ethers, and imidazoles may be used as a representative example. The pyrrolidones are not particularly limited as long as the pyrrolidone has a pyrrolidone skeleton. For example, 2-pyrrolidone, N-alkyl-2-pyrrolidone, and 1-alkyl-2-pyrrolidone may be used as pyrrolidones. For example, 1,3-dimethyl-2-imidazolidinone may be used as imidazolidinones, dimethylsulfoxide may be used as sulfoxides, γ-butyrolactone may be used as lactones, and imidazole, 1-methyl imidazole, 2-methyl imidazole, and 1,2-dimethyl imidazole may be used as imidazoles.

The monoalcohol is not particularly limited, but for example, methanol, ethanol, n-propyl alcohol, iso-propyl alcohol, n-butanol, 2-butanol, tert-butanol, iso-butanol, n-pentanol, 2-pentanol, 3-pentanol, and tert-pentanol may be used.

The alkyl polyol is not particularly limited, but for example, glycerin, ethylene glycol, diethylene glycol, triethylene glycol, propylene glycol(1,2-propanediol), dipropylene glycol, 1,3-propylene glycol(1,3-propanediol), isobutylene glycol(2-methyl-1,2-propanediol), 1,2-butanediol, 1,3-butanediol, 1,4-butanediol, 2-butene-1,4-diol, 1,2- pentanediol, 1,5-pentanediol, 3-methyl-1,5-pentanediol, 2-methyl-2,4-pentanediol, 1,2-hexanediol, 1,6-hexanediol, 2-ethyl-1,3-hexanediol, 1,7-heptanediol, and 1,8-octanediol may be used.

The glycol ether is not particularly limited, but for example, glycol diethers and glycol monoethers may be used.

A specific example of the glycol ether is not particularly limited, but ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether may be used.

A specific example of the glycol monoether is not limited, but ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether may be used.

One organic solvent may be used alone, or two or more organic solvents may be used in combination.

The content of the organic solvent is preferably 5.0 mass % or more and 50 mass % or less, and is more preferably 10 mass % or more and 30 mass % or less, with respect to the total quantity (100 mass %) of the ink composition. The content of the organic solvent is 50 mass % or less, thereby, drying property of the ink composition which is attached to the recording medium tends to be further enhanced. The content of the organic solvent is 5.0 mass % or more, thereby, there is a tendency that discharge stability of the ink composition can be secured.

Acidic Compound

The ink composition according to the embodiment can further include an acidic compound from the viewpoint of preservation stability, and in order to adjust the pH. The acidic compound is not particularly limited, but for example, an organic acid and an inorganic acid may be used. It is preferable that the organic acid be used.

The organic acid is not particularly limited, but it is preferable that a compound having a carboxylic acid structure be used. As a carboxylic acid structure, for example, a carboxy group may be used. Since the organic acid having the carboxy group is excellent in solubility to water, it is preferable that the organic acid in which the number of carbon atoms of an alkyl chain except for carbon atoms of the carboxy group is 3 or less be used. As a specific example of such an organic acid, a monocarboxylic acid such as a formic acid, an acetic acid, a 1-propionic acid, a butyric acid, a valeric acid, or a pyruvic acid; a dicarboxylic acid such as an oxalic acid, a malonic acid, a succinic acid, an adipic acid, a glutaric acid, or a fumaric acid; or a hydroxycarboxylic acid such as a lactic acid, a malic acid, a citric acid, a tartaric acid, or a gluconic acid may be used. It is more preferable that the adipic acid, the citric acid, and the 1-propionic acid be used.

The inorganic acid is not particularly limited, but for example, a hydrochloric acid and a sulfuric acid may be used.

One acidic compound may be used alone, or two or more acidic compounds may be used in combination.

The content of the acidic compound is preferably 0.01 mass % or more and 3.0 mass % or less, is more preferably 0.01 mass % or more and 2.0 mass % or less, is further preferably 0.05 mass % or more and 1.0 mass % or less, and still further preferably 0.1 mass % or more and 0.5 mass % or less, with respect to the total quantity (100 mass %) of the ink composition. The content of the acidic compound is within the range described above, thereby, the preservation stability tends to be further enhanced.

Basic Compound

The ink composition according to the embodiment can further include a basic compound from the viewpoint of preservation stability, and in order to adjust the pH. The basic compound is not particularly limited, but for example, a basic organic compound and a basic inorganic compound may be used.

The basic organic compound is not particularly limited, but organic amine is preferable. Dimethylamine, diethylamine, trimethylamine, triethylamine, diethanolamine, dimethylethanolamine, triethanolamine, triisopropanolamine, diethylethanolamine, triethanolamine, and ammonium hydroxide are more preferable. From the viewpoint of preventing an odor, triethanolamine and triisopropanolamine are further preferable.

The basic inorganic compound is not particularly limited, but for example, an alkali metal hydroxide such as a lithium hydroxide, a sodium hydroxide, or a potassium hydroxide may be used.

One basic compound may be used alone, or two or more basic compounds may be used in combination.

The content of the basic compound is preferably 0.01 mass % or more and 5.0 mass % or less, is more preferably 0.01 mass % or more and 3.0 mass % or less, and is further preferably 0.2 mass % or more and 1.0 mass % or less, with respect to the total quantity (100 mass %) of the ink composition. The content of the basic compound is within the range described above, thereby, the preservation stability tends to be further enhanced.

Each of the acidic compound and the basic compound may be used alone, but it is more preferable that the acidic compound and the basic compound be used in combination. The acidic compound and the basic compound are used in combination, thereby, it is possible to maintain the ink composition in a preferable pH range, due to a pH buffer action.

Surfactant

From the viewpoint of wettability, it is preferable that the ink composition further include a surfactant. The surfactant is not particularly limited, but for example, an acetylene glycol-based surfactant, a fluorine-based surfactant, and a silicone-based surfactant may be used.

The acetylene glycol-based surfactant is not particularly limited, but it is preferable that one or more selected from 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol be used. A commercial product of the acetylene glycol-based surfactant is not particularly limited, but for example, Olfine 104 series or Olfine E series such as Olfine E1010 (product name manufactured by Air Products Japan, Inc.), Surfynol 104, 465, or 61, or DF 110D (product name manufactured by Nissin Chemical Industry Co., Ltd.) may be used. One acetylene glycol-based surfactant may be used alone, or two or more acetylene glycol-based surfactants may be used in combination.

The fluorine-based surfactant is not particularly limited, but for example, perfluoroalkyl sulfonate, perfluoroalkyl carboxylate, perfluoroalkyl phosphate ester, perfluoroalkyl ethylene oxide adduct, perfluoroalkyl betaine, and a perfluoroalkyl amine oxide compound may be used. The commercial product of the fluorine-based surfactant is not particularly limited, but for example, S-144 and S-145 (hitherto, trade names manufactured by Asahi Glass Co., Ltd.); FC-170C, FC-430, FC4430 (hitherto, trade names manufactured by Sumitomo 3M Ltd.) of fluorad; FSO, FSO-100, FSN, FSN-100, and FS-300 (hitherto, trade names manufactured by Dupont Company); or FT-250 and FT-251 (hitherto, trade names manufactured by NEOS Co., Ltd.) may be used. One fluorine-based surfactant may be used alone, or two or more fluorine-based surfactants may be used in combination.

The silicone-based surfactant is not particularly limited, but for example, a polysiloxane-based compound and a polyether modified organosiloxane may be used. The commercial product of the silicone-based surfactant is not particularly limited, but specifically, BYK-306, BYK-307, BYK-333, BYK-341, BYK-345, BYK-346, BYK-347, BYK-348, and BYK-349 (hitherto, trade names manufactured by BYK-Chemie GmbH), or KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hitherto, trade names manufactured by Shin-Etsu Chemical Co., Ltd.) may be used. One silicone-based surfactant may be used alone, or two or more silicone-based surfactants may be used in combination.

The content of the surfactant is preferably 0.05 mass % or more and 2.5 mass % or less, and is more preferably 0.05 mass % or more and 1.5 mass % or less, with respect to the total quantity (100 mass %) of the ink composition. The content of the surfactant is within the range described above, thereby, the wettability of the ink composition which is attached to the recording medium tends to be further enhanced.

The ink composition can suitably contain various additives such as a wax, a dissolving assistant, a viscosity adjusting agent, an antioxidant, an antifungal-antiseptic agent, a mildew-proofing agent, a corrosion inhibitor, and a chelating agent (for example, sodium ethylenediaminetetraacetate) for catching metal ions which influence dispersion, as other components.

It is preferable that the ink composition according to the embodiment be used in a textile printing method described later.

Ink Set

An ink set according to the embodiment includes the ink composition according to the embodiment, and one or two or more ink compositions selected from a group which is formed of the yellow ink, the magenta ink, the cyan ink, the red ink, the blue ink, the black ink, and the orange ink in addition to the ink composition according to the embodiment. The ink set according to the embodiment further includes the ink composition of a key color (yellow, magenta, cyan, or black) ink or a special color (red, blue, or orange) ink, thereby, it is possible to form the high-resolution image of which color reproducibility is higher than ever. The ink composition according to the embodiment and the ink composition of the key color ink or the special color ink are used in combination, and are mixed on the textile, thereby, the recording is performed, suitable toning is likely to be finely adjusted with respect to hue which matches with needs of a customer, and it is possible to provide the image of which the color reproducibility is higher than ever, and which is excellent in gradation. The yellow ink, the magenta ink, the cyan ink, the red ink, the blue ink, the black ink, and the orange ink can respectively use the coloring materials other than the compound A and the compound B described above.

Recording Method

A recording method according to the embodiment includes a process (transport process) of transporting the recording medium include the textile, and a process (recording process) of recording the ink composition according to the embodiment described above on the recording medium. The recording method according to the embodiment may be the textile printing method in which the recording medium includes the textile. FIGURE is a flowchart illustrating an example of the textile printing method according to the embodiment after the recording process. As illustrated in FIGURE, the textile printing method according to the embodiment may further include a heating process and a cleaning process, in addition to the recording process.

The textile printing method described above, may be an ink jet textile printing method in which the ink composition is used by being charged in an ink jet apparatus. The ink jet apparatus is not particularly limited, but for example, a drop-on-demand type ink jet apparatus may be used. The drop-on-demand type ink jet apparatus may be an apparatus that adopts the ink jet textile printing method using a piezoelectric element which is disposed in a head, an apparatus that adopts the ink jet textile printing method using thermal energy due to a heater of a heating resistance element which is disposed in the head, or the like, and any of the ink jet textile printing methods may be adopted. Hereinafter, each of the processes which are included in the ink jet textile printing method, will be described in detail.

Transport Process

The transport process according to the embodiment is a process of transporting the recording medium including the textile. For example, as transport means of the recording medium, a known transport means by the ink jet method may be used.

Recording Process

The recording process according to the embodiment is a process of recording the ink composition described later on the recording medium. In a case where the ink jet method is used, the ink composition is discharged by the ink jet method, towards a surface (image forming region) of the textile which is at least a portion of the recording medium, and is attached to the recording medium, and the image is formed. A discharge condition may be suitably determined depending on physical properties of the discharged ink composition.

Heating Process

The textile printing method according to the embodiment may further include the heating process of heating the recording medium to which the ink composition is attached, after the recording process. The heating process is included, thereby, it is possible to more favorably dye fibers configuring the textile, with the coloring material. A heating method is not particularly limited, but for example, a high temperature steaming (HT) method, a high pressure steaming (HP) method, or a thermosol method may be used.

In the heating process, an ink composition attachment surface on the recording medium may be pressurized and treated, or may not be pressurized and treated. As a heating method in a case where the ink composition attachment surface on the recording medium is not pressurized and treated, oven drying (a method in which pressing is not performed, with an oven such as a conveyor oven or a batch oven) may be used. Such a heating process is included, thereby, productivity of the recorded material is further enhanced. The heating method in a case where the ink composition attachment surface on the recording medium is pressurized and treated, is not particularly limited, but for example, a heat press method, or a wet-on-dry method may be used. "Pressurization" is referred to as a case where the pressure is applied to the recording medium by being in contact with a solid to the recording medium.

A temperature at the time of heating treatment is preferably 80° C. or higher and 150° C. or lower, and is more preferably 90° C. or higher and 110° C. or lower. The temperature at the time of heating treatment is within the range described above, thereby, there is a tendency that it is possible to more favorably dye fibers configuring the textile, with the coloring material.

Cleaning Process

The textile printing method according to the embodiment may further include the cleaning process of cleaning the recording medium to which the ink composition is attached, after the heating process. By the cleaning process, it is possible to effectively remove a pigment with which the fibers are not dyed. For example, it is possible to perform the cleaning process by using the water, and a soaping treatment may be performed as necessary. A soaping treatment method is not particularly limited, but for example, that is, a method of washing off the unfixed pigment with a hot soap solution or the like, may be used.

In this manner, it is possible to obtain the recorded material such as a textile printed material in which the image derived from the ink composition described above is formed on the recording medium including the textile printed material.

Recording Medium

The recording medium according to the embodiment is not particularly limited, but for example, an absorptive recording medium, a low-absorptive recording medium, a non-absorptive recording medium, or the textile may be used. Therein, the recording medium including the textile (including the textile itself) is preferable.

Here, the "low-absorptive recording medium" or the "non-absorptive recording medium" is referred to as a recording medium of which a water absorption quantity is 10 mL/m² or less until 30 msec from a contact start by Bristow method. The Bristow method is the most widespread method as a method for measuring a liquid absorption quantity in a short time, and is adopted by Japan Technical Association of the Pulp and Paper Industry (JAPAN TAPPI). Details of a test method are written in standard No. 51 "paper and board-liquid absorption test method-Bristow method" of "JAPAN TAPPI paper pulp test methods published in 2000".

The non-absorptive recording medium or the low-absorptive recording medium can be classified in accordance with the wettability with respect to the water of a recording surface. Specifically, a water droplet of 0.5 µL is dropped onto the recording surface of the recording medium, and a lowering rate (the comparison of the contact angle at 0.5 msec after landing with the contact angle at 5 seconds thereafter) of a contact angle is measured, thereby, it is possible to characterize the recording medium. More specifically, as a property of the recording medium, non-absorbability of the "non-absorptive recording medium" indicates that the lowering rate is less than 1%, and low absorbability of the "low-absorptive recording medium" indicates that the lowering rate is 1% or more and less than 5%. The absorbability indicates that the lowering rate is 5% or more. It is possible to measure the contact angle by using a portable contact angle meter PCA-1 (manufactured by Kyowa Interface Science Co., Ltd.) or the like.

The absorptive recording medium is not particularly limited, but for example, the recording medium of which the permeability of the ink composition is relatively low, and which is used for general offset printing, such as art paper, coating paper, or casting paper, from the recording medium of which permeability of the ink composition is high, and which includes the textile, such as plain paper of electrophotoraphic paper or the like, or ink jet paper (ink jet exclusive paper including an ink absorbing layer which is formed of silica particles or alumina particles, or an ink absorbing layer which is formed of a hydrophilic polymer such as polyvinyl alcohol (PVA) or polyvinyl pyrrolidone (PVP)), may be used.

The low-absorptive recording medium is not particularly limited, but for example, coated paper in which a coated layer for receiving an oil-based ink on the surface thereof is disposed, may be used. The coated paper is not particularly limited, but for example, actual printing paper such as art paper, coating paper, or matte paper may be used.

The non-absorptive recording medium is not particularly limited, but for example, the recording medium in which plastic is coated on a base material such as a plastic film or paper which does not have the ink absorbing layer, or the recording medium to which the plastic film is bonded may be used. Here, as plastic, for example, polyvinyl chloride, polyethylene terephthalate, polycarbonate, polystyrene, polyurethane, polyethylene, or polypropylene may be used.

In addition to the recording medium described above, it is possible to use the non-absorptive recording medium or a low-absorptive recording medium such as a plate of metals such as iron, silver, copper and aluminum, or glass.

The textile is not limited to the following materials, but for example, blended fabrics such as silk, cotton, wool, nylon, polyester, polyamide, and polyurethane, natural fibers such as rayon, or synthetic fibers may be used. The textile may be formed of one fiber, or may be formed by blending two or more fibers. Therein, the textile obtained by blending the fibers which are different from each other in permeability is particularly used, thereby, effects of the embodiment is likely to be obtained with ease. As a textile, the fibers described above may be made into any form of woven fabric, knitted fabric, and non-woven fabric.

The recording medium including the textile may be the textile itself, but it is preferable that the textile which is pretreated with a pretreatment liquid including resin particles be used. The textile is pretreated, thereby, the textile printed material which is more excellent in friction fastness property, tends to be obtained. The pretreatment of the textile with the pretreatment liquid including the resin particles, may be performed by a method which is known in the related art.

EXAMPLES

Hereinafter, the invention will be specifically described with reference to Examples. The invention is not whatever limited by the following Examples.

Synthesis Example 1

Compound B Represented by Formula (6)

In a flask of 200 mL, commercially available catechol (CAS 120-80-9) of 20 g was heated at 110° C., and was dissolved. Subsequently, sulfuric acid of 40 g was added thereto, and heating reflux was performed for 3 hours at 120° C. The heating was stopped, and a standstill was performed for 1 week at 25° C. The unreacted catechol was removed by using an aqueous solution of methylene chloride and sodium acetate, and quenching was performed with hydrochloric acid. Next, extraction was further performed with methylene chloride, and o-benzoquinone-p-sulfonic acid was obtained as 15 g.

The obtained o-benzoquinone-p-sulfonic acid of 5g and commercially available acetoacetic acid (CAS 541-50-4) of 5 g were stirred for 24 hours at 120° C. in ammonia water, and (1H-6-sulfobenzimidazole-2-yl)acetic acid was obtained as 6 g.

The obtained (1H-6-sulfobenzimidazol-2-yl)acetic acid of 6 g, DCC(N,N'-dicyclohexylcarbodiimide) of 19.3 g, and 0.1 M hydrochloric acid of 5 mL were added to water of 200 mL, and were stirred for 30 minutes at 25° C. Subsequently, 4-(diethylamino)salicylaldehyde (manufactured by Tokyo Chemical Industry Co., Ltd.) of 2 g was further added, and was stirred for 12 hours at 80° C., and the quenching was performed with calcium carbonate. The DCC was separated and extracted by adding methylene chloride, and the compound B represented by Formula (6) was obtained as 6 g from an aqueous layer.

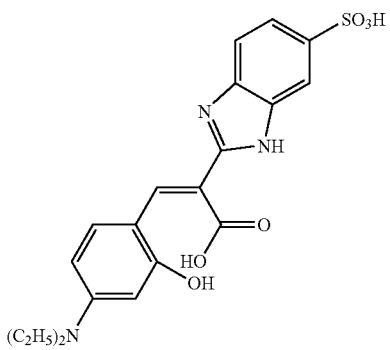

(6)

Synthesis Example 2

Compound B Represented by Formula (7)

In a mixture liquid of methanol of 120 mL with the water of 30 mL, after sodium hydroxide of 0.5 g and 3-cyano-7-(diethylamino)coumarin (CAS 51473-74-6/manufactured by Tokyo Chemical Industry Co., Ltd.) of 10 g were stirred for hours at 80° C., a drying under reduced pressure was performed. The obtained product was separated and refined by a column chromatography (filler: Silica gel 60 (globe shape), particle size 100 maikurom to 210 maikurom/CAS 7631-86-9/500 g, developing solvent: hexane:ethyl acetate=7:3/2000 mL). Thereafter, the obtained liquid was dried under the reduced pressure, and the compound B represented by Formula (7) was obtained as 3 g.

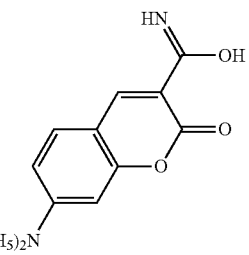

(7)

In the water of 100 mL, Acid Yellow 250 (CAS 93859-32-6) of 5 g and sodium hydroxide of 0.5 g were stirred while the heating reflux was performed for 24 hours at 100° C. The product was separated and refined by the column chromatography (filler: Silica gel 60 (globe shape), particle size 100 maicurom to 210 maikurom/CAS 7631-86-9/500 g, developing solvent: hexane:ethyl acetate=5:5/3000 mL). Thereafter, the obtained liquid was dried under the reduced pressure, and the compound B represented by Formula (8) was obtained as 3 g.

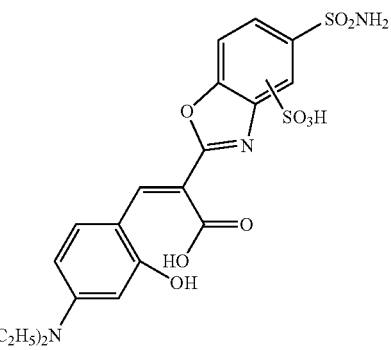

(8)

Materials of Ink Composition

Main materials of the ink composition which is used in manufacturing of the recorded material described below, are as follow.

<Compound A>
C.I. Acid Yellow 184 (includes the compound represented by Formula (1) indicating that R: $N(C_2H_5)_2$ and R': sulfate group; and is abbreviated as "AY184" in the tables)
C.I. Acid Yellow 250 (includes the compound represented by Formula (4) indicating that R: $N(C_2H_5)_2$ and R': sulfate group; and is abbreviated as "AY250" in the tables)
<Compound B>
Compound represented by Formula (6) (is abbreviated as "Formula (6)" in the tables)

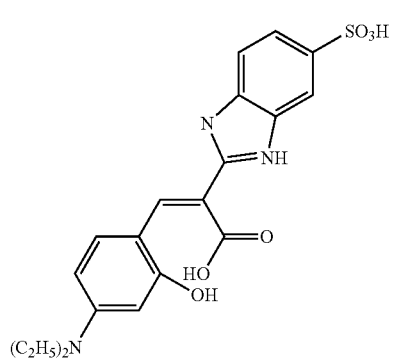

(6)

Compound represented by Formula (7) (is abbreviated as "Formula (7)" in the tables)

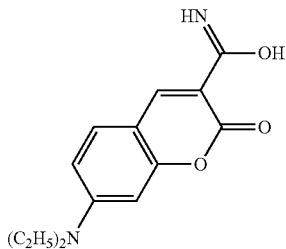

Compound represented by Formula (8) (is abbreviated as "Formula (8)" in the tables)

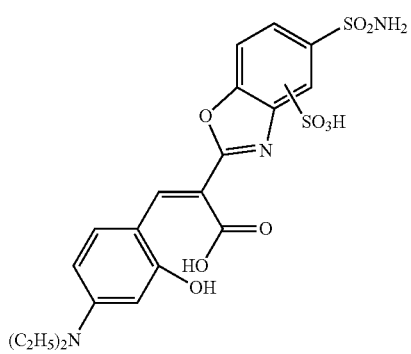

<Solvent>
Glycerin
Triethylene glycol
Triethylene glycol monobutyl ether
3-methyl-1,5-pentanediol
2-pyrrolidone
<Acidic Compound>
Adipic acid
Citric acid
1-propionic acid
<Basic Compound>
Triethanolamine
Sodium hydroxide
<Surfactant>
Olfine E1010 (trade name manufactured by Air Products Japan, Inc.)
<Antifungal-Antiseptic Agent>
Proxel XL2 (trade name manufactured by Arch Chemicals Inc.)
<Others>
Benzotrizole
Ethylenediaminetetraacetic acid (EDTA)
Pure water Preparation of Ink Composition Each of the materials were mixed by the composition illustrated in Table 1 and Table 2, and were sufficiently stirred, thereby, the ink composition was obtained. In Table 1 and Table 2, a unit of a numerical value is mass o, the numerical value is a solid content concentration, and a total is 100.0 mass %.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Coloring material | Compound A | AY184 | 0.700 | — | 0.700 | 0.700 | 0.700 | 0.960 | 0.700 | 0.997 | 0.400 | 11.000 | 0.700 |
| | | AY250 | — | 0.700 | — | — | — | — | — | — | — | — | — |
| | Compound B | Formula (6) | 0.300 | — | 0.200 | 0.300 | 0.570 | 0.040 | 0.850 | 0.003 | 0.180 | 1.220 | 0.300 |
| | | Formula (7) | — | — | 0.100 | — | — | — | — | — | — | — | — |
| | | Formula (8) | — | 0.300 | — | — | — | — | — | — | — | — | — |
| Solvent | | Glycerin | 10 | 10 | 10 | 10 | 10 | 10 | 10 | 10 | 10 | 10 | 10 |
| | | Triethylene glycol | 10 | 10 | 10 | 10 | 10 | 10 | 10 | 10 | 10 | 10 | 10 |
| | | Triethylene glycol monobutyl ether | 4.0 | 4.0 | 4.0 | 4.0 | 4.0 | 4.0 | 4.0 | 4.0 | 4.0 | 4.0 | 4.0 |
| | | 3-methyl-1,5-pentanediol | 4.0 | 4.0 | 4.0 | 4.0 | 4.0 | 4.0 | 4.0 | 4.0 | 4.0 | 4.0 | 4.0 |
| | | 2-pyrrolidone | 5.0 | 5.0 | 5.0 | 5.0 | 5.0 | 5.0 | 5.0 | 5.0 | 5.0 | 5.0 | 5.0 |
| Acidic compound | | Adipic acid | 0.15 | 0.15 | 0.15 | — | 0.15 | 0.15 | 0.15 | 0.15 | 0.15 | 0.15 | 0.05 |
| | | Citric acid | — | — | — | 0.2 | — | — | — | — | — | — | — |
| | | 1-propionic acid | — | — | — | — | — | — | — | — | — | — | — |
| Basic compound | | Triethanolamine | 0.5 | 0.5 | 0.5 | 0.5 | 0.5 | 0.5 | 0.5 | 0.5 | 0.5 | 0.5 | 0.5 |
| | | Sodium hydroxide | — | — | — | — | — | — | — | — | — | — | — |
| Surfactant | | Olfine E1010 | 1.0 | 1.0 | 1.0 | 1.0 | 1.0 | 1.0 | 1.0 | 1.0 | 1.0 | 1.0 | 1.0 |
| Others | | ProxelXL2 | 0.2 | 0.2 | 0.2 | 0.2 | 0.2 | 0.2 | 0.2 | 0.2 | 0.2 | 0.2 | 0.2 |
| | | Benzotrizole | 0.01 | 0.01 | 0.01 | 0.01 | 0.01 | 0.01 | 0.01 | 0.01 | 0.01 | 0.01 | 0.01 |
| | | EDTA | 0.01 | 0.01 | 0.01 | 0.01 | 0.01 | 0.01 | 0.01 | 0.01 | 0.01 | 0.01 | 0.01 |
| Water | | | Residual quantity | Residual quantity | Residual quantity | Residual quantity | Residual quantity | Residual quantity | Residual quantity | Residual quantity | Residual quantity | Residual quantity | Residual quantity |
| Total | | | 100 | 100 | 100 | 100 | 100 | 100 | 100 | 100 | 100 | 100 | 100 |
| Content ratio (compound A:compound B) | | | 30/70 | 30/70 | 30/70 | 30/70 | 45/55 | 4/96 | 55/45 | 0.3/99.7 | 31/69 | 10/90 | 30/70 |
| pH | | | 7.2 | 7.2 | 7.2 | 7.2 | 7.2 | 7.2 | 7.2 | 7.2 | 7.2 | 7.2 | 8.5 |

TABLE 1-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Color stability | A | A | A | A | A | B | A | C | A | A | A |
| Chromogenic property | A | A | A | A | A | A | A | A | B | AA | A |
| Fluorescence | A | A | A | A | B | A | C | A | A | C | A |
| Preservation stability | AA | AA | AA | AA | AA | AA | AA | AA | AA | AA | A |

TABLE 2

| | | | Example | | | | | |
|---|---|---|---|---|---|---|---|---|
| | | | 12 | 13 | 14 | 15 | 16 | 17 |
| Coloring material | Compound A | AY184 | 0.700 | 0.700 | 0.700 | 0.700 | 0.700 | 0.700 |
| | | AY250 | — | — | — | — | — | — |
| | Compound B | Formula (6) | 0.300 | 0.300 | 0.300 | 0.300 | 0.300 | 0.300 |
| | | Formula (7) | — | — | — | — | — | — |
| | | Formula (8) | — | — | — | — | — | — |
| | Solvent | Glycerin | 10 | 10 | 10 | 10 | 10 | 10 |
| | | Triethylene glycol | 10 | 10 | 10 | 10 | 10 | 10 |
| | | Triethylene glycol monobutyl ether | 4.0 | 4.0 | 4.0 | 4.0 | 4.0 | 4.0 |
| | | 3-methyl-1,5-pentanediol | 4.0 | 4.0 | 4.0 | 4.0 | 4.0 | 4.0 |
| | | 2-pyrrolidone | 5.0 | 5.0 | 5.0 | 5.0 | 5.0 | 5.0 |
| Acidic compound | | Adipic acid | 0.6 | 1.1 | — | — | — | 0.15 |
| | | Citric acid | — | — | — | — | — | — |
| | | 1-propionic acid | — | — | 0.2 | — | — | — |
| Basic compound | | Triethanolamine | 2.6 | 5.0 | 0.5 | 1.0 | — | — |
| | | Sodium hydroxide | — | — | — | — | — | 0.1 |
| Surfactant | | Olfine E1010 | 1.0 | 1.0 | 1.0 | 1.0 | 1.0 | 1.0 |
| Others | | ProxelXL2 | 0.2 | 0.2 | 0.2 | 0.2 | 0.2 | 0.2 |
| | | Benzotrizole | 0.01 | 0.01 | 0.01 | 0.01 | 0.01 | 0.01 |
| | | EDTA | 0.01 | 0.01 | 0.01 | 0.01 | 0.01 | 0.01 |
| | | Water | Residual quantity | Residual quantity | Residual quantity | Residual quantity | Residual quantity | Residual quantity |
| | | Total | 100 | 100 | 100 | 100 | 100 | 100 |
| | | Content ratio (compound A:compound B) | 30/70 | 30/70 | 30/70 | 30/70 | 30/70 | 30/70 |
| | | pH | 7.2 | 7.2 | 7.2 | 9.5 | 7.0 | 8.0 |
| | | Color stability | A | A | A | A | A | A |
| | | Chromogenic property | A | A | A | A | A | A |
| | | Fluorescence | A | A | A | A | A | A |
| | | Preservation stability | A | A | A | B | C | B |

| | | | Example | | Comparative Example | | | |
|---|---|---|---|---|---|---|---|---|
| | | | 18 | 19 | 1 | 2 | 3 | 4 |
| Coloring material | Compound A | AY184 | 5.600 | 0.700 | 1.000 | — | — | — |
| | | AY250 | — | — | — | 1.000 | — | — |
| | Compound B | Formula (6) | 6.800 | 0.300 | — | — | 1.000 | — |
| | | Formula (7) | — | — | — | — | — | — |
| | | Formula (8) | — | — | — | — | — | 1.000 |
| | Solvent | Glycerin | 10 | 10 | 10 | 10 | 10 | 10 |
| | | Triethylene glycol | 10 | 10 | 10 | 10 | 10 | 10 |
| | | Triethylene glycol monobutyl ether | 4.0 | 4.0 | 4.0 | 4.0 | 4.0 | 4.0 |
| | | 3-methyl-1,5-pentanediol | 4.0 | 4.0 | 4.0 | 4.0 | 4.0 | 4.0 |
| | | 2-pyrrolidone | 5.0 | 5.0 | 5.0 | 5.0 | 5.0 | 5.0 |
| Acidic compound | | Adipic acid | 0.15 | — | 0.15 | 0.15 | 0.15 | 0.15 |
| | | Citric acid | — | — | — | — | — | — |
| | | 1-propionic acid | — | — | — | — | — | — |
| Basic compound | | Triethanolamine | 0.5 | — | 0.5 | 0.5 | 0.5 | 0.5 |
| | | Sodium hydroxide | — | 0.15 | — | — | — | — |
| Surfactant | | Olfine E1010 | 1.0 | 1.0 | 1.0 | 1.0 | 1.0 | 1.0 |
| Others | | ProxelXL2 | 0.2 | 0.2 | 0.2 | 0.2 | 0.2 | 0.2 |
| | | Benzotrizole | 0.01 | 0.01 | 0.01 | 0.01 | 0.01 | 0.01 |
| | | EDTA | 0.01 | 0.01 | 0.01 | 0.01 | 0.01 | 0.01 |
| | | Water | Residual quantity | Residual quantity | Residual quantity | Residual quantity | Residual quantity | Residual quantity |
| | | Total | 100 | 100 | 100 | 100 | 100 | 100 |
| | | Content ratio (compound A:compound B) | 55/45 | 30/70 | — | — | — | — |
| | | pH | 7.2 | 10.5 | 7.2 | 7.2 | 7.2 | 7.2 |
| | | Color stability | A | A | D | D | D | D |
| | | Chromogenic property | A | A | A | A | A | A |
| | | Fluorescence | C | A | A | A | A | A |
| | | Preservation stability | AA | C | AA | AA | AA | AA |

Manufacturing of Textile Printed Material

Each ink composition which was prepared described above, was attached to a textile formed with mixed spinning of polyamide and polyurethane, by an ink jet method using an ink jet printer (product name "PX-G930" manufactured by Seiko Epson Corporation). As a recording condition, recording resolution was set to 1440 dpi×720 dpi, ink mass was set to 23 ng/dot, and a recording range was set to an A4 size. Four layers of solid filling images were overlapped and applied, thereby, the textile printed material in which the image was formed (the textile printing of the ink was performed) on the textile being the recording medium was manufactured. In this manner, the ink jet textile printing was performed. Here, the "solid filling image" means an image that is obtained by recording the dots to all pixels in a pixel being a minimum recording unit region defined by the recording resolution.

Color Stability

After the textile printed material which was obtained in the "manufacturing of the textile printed material" described above was left for 1 hour, the heating treatment thereof was performed for 30 minutes at 100° C. with a steamer (manufactured by Matisse Corporation; Steamer DHe type), and a textile printed material A on which the ink composition was fixed was made. A color difference ΔEt between the textile printed material A immediately after made and the textile printed material A after 24 hours subsequently to the making was calculated. The used ink composition was changed into the ink composition of which the heating treatment was performed for 120 hours at 60° C., and a textile printed material B was made in the same manner as described above. A color difference ΔEh between the textile printed material A and the textile printed material B immediately after made was calculated, and the color stability was evaluated in accordance with the following evaluation standards. A fluorescent spectrum densitometer ("FD-7" manufactured by Konica Minolta Inc.) was used for the measurement of the color difference. The obtained results are illustrated in Table 1 and Table 2.

(Evaluation Standards)
AA: both of ΔEt and ΔEh are less than 1.0
A: both of ΔEt and ΔEh are less than 5.0, and any of ΔEt and ΔEh is 1.0 or more and less than 2.5
B: both of ΔEt and ΔEh are less than 5.0, and any of ΔEt and ΔEh is 2.5 or more and less than 5.0
C: any of ΔEt and ΔEh is 5.0 or more Chromogenic Property Thereafter, the heating treatment of the textile printed material which was obtained in the "manufacturing of the textile printed material" described above, was performed for 30 minutes at 100° C. with the steamer (manufactured by Matisse Corporation; Steamer DHe type). Regarding the textile printed material on which the ink composition was fixed, an OD value was obtained, and the chromogenic property was evaluated in accordance with the following evaluation standards. The fluorescent spectrum densitometer ("FD-7" manufactured by Konica Minolta Inc.) was used for the measurement of the OD value. The obtained results are illustrated in Table 1 and Table 2. AA, A, B, and C indicate levels which do not practically matter.

(Evaluation Standards)
AA: 1.5 or more
A: 1.2 or more and less than 1.5
B: 0.9 or more and less than 1.2
C: 0.6 or more and less than 0.9
D: less than 0.6

Fluorescence

Thereafter, the heating treatment of the textile printed material which was obtained in the "manufacturing of the textile printed material" described above was performed for 30 minutes at 100° C. with the steamer (manufactured by Matisse Corporation; Steamer DHe type). Regarding the textile printed material on which the ink composition was fixed, a fluorescent whitening intensity was obtained, and the fluorescence was evaluated in accordance with the following evaluation standards. The fluorescent spectrum densitometer ("FD-7" manufactured by Konica Minolta Inc.) was used for the measurement of the fluorescent whitening intensity. The obtained results are illustrated in Table 1 and Table 2. AA, A, B, and C indicate levels which do not practically matter.

(Evaluation Standards)
AA: 5.0 or more
A: 1.0 or more and less than 5.0
B: 0.5 or more and less than 1.0
C: 0.1 or more and less than 0.5
D: less than 0.1

Preservation Stability

In each ink composition immediately after the ink composition was prepared as described above, and the ink composition which was left for 7 days at 70° C., absorbance (Abs.) was respectively measured by using a UV-visible near infrared absorptiometer (trade name "V-770" manufactured by JASCO Corporation). When the absorbance of the ink composition immediately after prepared was made as 100, the absorbance of the ink composition after left was obtained, and preservation stability was evaluated in accordance with the following evaluation standards. The obtained results are illustrated in Table 1 and Table 2. AA, A, B, and C indicate levels which do not practically matter.

(Evaluation Standards)
AA: 95 or more
A: 90 or more and less than 95
B: 85 or more and less than 90
C: 60 or more and less than 85
D: less than 0.6

The entire disclosure of Japanese Patent Application No. 2017-036966, filed Feb. 28, 2017 is expressly incorporated by reference herein.

What is claimed is:

1. An ink jet ink composition comprising:
one or two or more compounds A selected from the group consisting of a compound represented by Formula (1) and a compound represented by Formula (4);
one or two or more compounds B selected from the group consisting of a compound represented by Formula (2), a compound represented by Formula (3), and a compound represented by Formula (5); and
water,

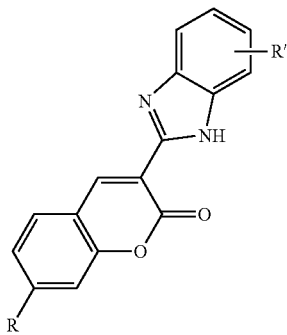

(1)

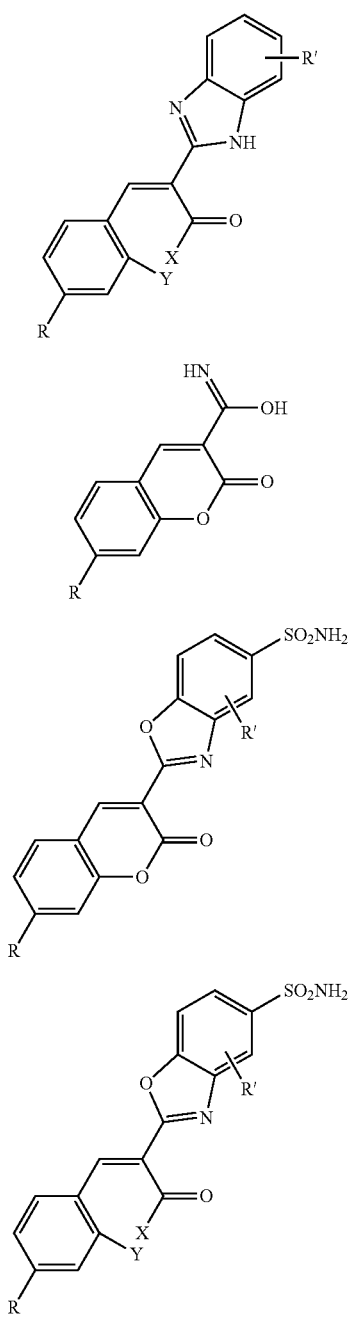

(in Formula (1) to Formula (5), R each independently represents $NZ_2$ or OZ; R' each independently represents a hydrogen atom, a sulfate group, or a sulfate; X each independently represents a hydroxyl group or a hydroxide salt; Y each independently represents a hydrogen atom, a hydroxyl group, or a hydroxide salt; and Z each independently represents a hydrogen atom or an alkyl group having 1 to 6 carbon atoms).

2. The ink jet ink composition according to claim 1, wherein a content ratio of the compound B to the compound A is 0.5/99.5 to 50/50, in a standard of mass.

3. The ink jet ink composition according to claim 1, wherein the ink jet ink composition includes the compound B which is 0.002 mass % to 2.5 mass % with respect to a total quantity of the ink jet ink composition.

4. The ink jet ink composition according to claim 1, wherein a pH of the ink jet ink composition is 6.0 to 9.5.

5. The ink jet ink composition according to claim 1, further comprising:
an organic acid.

6. The ink jet ink composition according to claim 5, wherein the organic acid has a carboxylic acid structure.

7. The ink jet ink composition according to claim 1, further comprising:
an organic amine.

8. An ink set comprising:
the jet ink composition according to claim 1; and
one or two or more ink compositions selected from a group which is formed of a yellow ink, a magenta ink, a cyan ink, a red ink, a blue ink, a black ink, and an orange ink.

9. An ink set comprising:
the jet ink composition according to claim 2; and
one or two or more ink compositions selected from a group which is formed of a yellow ink, a magenta ink, a cyan ink, a red ink, a blue ink, a black ink, and an orange ink.

10. An ink set comprising:
the jet ink composition according to claim 3; and
one or two or more ink compositions selected from a group which is formed of a yellow ink, a magenta ink, a cyan ink, a red ink, a blue ink, a black ink, and an orange ink.

11. An ink set comprising:
the jet ink composition according to claim 4; and
one or two or more ink compositions selected from a group which is formed of a yellow ink, a magenta ink, a cyan ink, a red ink, a blue ink, a black ink, and an orange ink.

12. An ink set comprising:
the jet ink composition according to claim 5; and
one or two or more ink compositions selected from a group which is formed of a yellow ink, a magenta ink, a cyan ink, a red ink, a blue ink, a black ink, and an orange ink.

13. An ink set comprising:
the jet ink composition according to claim 6; and
one or two or more ink compositions selected from a group which is formed of a yellow ink, a magenta ink, a cyan ink, a red ink, a blue ink, a black ink, and an orange ink.

14. An ink set comprising:
the jet ink composition according to claim 7; and
one or two or more ink compositions selected from a group which is formed of a yellow ink, a magenta ink, a cyan ink, a red ink, a blue ink, a black ink, and an orange ink.

15. A recording method comprising:
transporting a recording medium including a textile; and
recording the ink jet ink composition according to claim 1 on the recording medium.

16. A recording method comprising:
transporting a recording medium including a textile; and
recording the ink jet ink composition according to claim 2 on the recording medium.

17. A recording method comprising:
transporting a recording medium including a textile; and
recording the ink jet ink composition according to claim 3 on the recording medium.

18. A recording method comprising:
transporting a recording medium including a textile; and
recording the ink jet ink composition according to claim 4 on the recording medium.

19. A recording method comprising:
transporting a recording medium including a textile; and
recording the ink jet ink composition according to claim 5 on the recording medium.

20. A recording method comprising:
transporting a recording medium including a textile; and
recording the ink jet ink composition according to claim 6 on the recording medium.

\* \* \* \* \*